United States Patent Office 3,093,471
Patented June 11, 1963

3,093,471
ESTERIFIED ALKANOLAMINE SALTS OF HERBI-
CIDAL ARYLOXYALKANE MONOCARBOXYLIC
ACIDS
George M. Pflaumer, P.O. Box 309, Norristown, Pa.
No Drawing. Filed Mar. 30, 1960, Ser. No. 18,504
9 Claims. (Cl. 71—2.6)

This invention relates to esterified alkanolamine salts of herbicidal aryloxyalkane carboxylic acids and herbicidal compositions containing such salts which may be mixed with water to form emulsions for use in the control of the growth of vegetation.

FIELD OF THE INVENTION

It has been known for some time that various aryloxyalkane monocarboxylic acids, particularly 2,4-dichlorophenoxyacetic acid, and 2,4,5-trichlorophenoxyacetic acid (more popularly referred to as 2,4-D and 2,4,5-T) are useful herbicides for controlling the growth of vegetation. While the acids per se possess the required herbicidal activity, they are virtually insoluble in water, and other inexpensive organic solvents. Consequently, it has been necessary to use the acids in some other form in which they could be suitably applied to the area in which growth of vegetation is to be controlled. Various salts, esters and other derivatives of the herbicidal acids have been suggested and used in forming herbicidal compositions, e.g., see U.S. Patents 2,515,198 and 2,900,411.

Several problems have been experienced in the utilization of the aryloxyalkane carboxylic acids as herbicides. For example, the water-soluble salts of the acids, such as the sodium or the ammonium salts, are easily washed off of treated plants or leached from the soil, so that the herbicidal effects of such salts are quickly dissipated. Another problem is the tendency of many of the esters and other derivatives of the acids to "drift." This is a term used in the trade to describe the tendency of the herbicide to wander from the vegetation area to which it is applied, over to adjacent areas under the influence of air currents apparently due to partial vaporization. Such "drifting" can be a very serious problem because of damage to valuable crops growing in areas adjacent to those on which the herbicide has been applied. In some states, legislation has been passed to prohibit the use of certain classes of herbicidal materials because of the drift problem. Accordingly, manufacturers and formulators of herbicides have invested substantial time and money trying to develop new and improved forms of herbicides which will eliminate the drifting problem, and at the same time, will enable the herbicides to be mixed and used in an economical fashion in the field. The results of such work are reported in various technical publications and patents, e.g., see U.S. 2,771,477 and U.S. 2,876,089.

Still another problem connected with the use of aryloxyalkane monocarboxylic acids as herbicides is the need to compound or mix them with suitable solvents, extenders or the like to provide sufficient dilution of the herbicidal material to enable it to be successfully used for the control of vegetation. This has been accomplished in a variety of ways. One common method uses the herbicidal material in the form of an ester and dissolves the ester in a solvent to the required concentration, and then sprays or otherwise applies the resulting solution to the vegetation. Another method forms an oil-in-water emulsion from the herbicide, generally after it has been diluted to some extent with a solvent. Special emulsifying agents and herbicidal derivatives have been suggested for use in forming such emulsions. More recently, the use of water-in-oil emulsions have been found desirable as one means for reducing the drifting problem associated with the application of the herbicides.

OBJECTS

A principal object of the present invention is the provision of new herbicidal compositions which are derived from aryloxyalkane monocarboxylic acids. Further objects include:

(1) The provision of new herbicidal compositions which may be used for the control of growth of vegetation in a selected area without danger of drift of herbicidal ingredients to adjacent areas.

(2) The provision of such compositions which can be made and sold at a relatively low cost because they do not include expensive solvents or other additives.

(3) The provision of herbicidal concentrates which may be easily mixed with water in the field to form viscous water-in-oil emulsions that may be applied with known and available equipment to selected areas without the herbicidal ingredients spreading to adjacent areas.

(4) The provision of herbicidal concentrates in which the herbicidal material is present as a salt which itself functions as an emulsifying agent to cause the concentrate to form W/O emulsions when mixed with water.

(5) The provision of new processes for forming unique salts of herbicidal acids and herbicidal compositions.

(6) The provision of new and unique amine salts of herbicidal acids.

Other objects and further scope of applicability of the present invention will become apparent from the detailed description given hereinafter; it should be understood, however, that the detailed description, while indicating preferred embodiments of the invention, is given by way of illustration only, since various changes and modifications within the spirit and scope of the invention will become apparent to those skilled in the art from this detailed description.

GENERAL DESCRIPTION

These objects are accomplished according to the present invention through the formation of esterified alkanolamine salts of herbicidal aryloxyalkane monocarboxylic acids by mixing an alkanolamine with a monocarboxylic acid containing from 7 to 20 carbon atoms, heating the mixture and simultaneously removing the water formed from the reaction mixture, recovering the resulting esterified alkanolamine, and then reacting a herbicidal aryloxyalkane monocarboxylic acid with the esterified alkanolamine to form an amine salt. The resulting amine salt is then dissolved in a suitable solvent to form a herbicidal composition or concentrate which may be subsequently mixed with water to form a water-in-oil emulsion for application in the field to control the growth of vegetation.

By way of example, a preferred group of the new salts of herbicidal aryloxyalkane carboxylic acids are those having the formula:

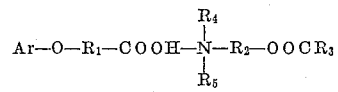

wherein Ar is an aryl radical, $R_1$ and $R_2$ are alkylene radicals, $R_3$ is an alkyl or cycloalkyl radical of 6 to 19 carbon atoms and $R_4$ and $R_5$ are hydrogen, alkyl, alkanol, or —$R_2OOCR_3$ radicals.

The success of the present invention is due in part to the discovery that esterified alkanolamine salts of aryloxyalkane monocarboxylic acids are miscible, i.e., compatible, with substantial amounts of the free acids. In other words, the amine salts function as solvents for the free acids. Consequently, this makes it possible to create herbicidal compositions with a high "active" ingredient content. Moreover, these amine salts are capable of solubilizing esters of the herbicidal acids.

A second discovery of this invention is that these amine salts function as emulsifying agents which may be used to emulsify the herbicidal acids or esters of the acids to give W/O emulsions. This is a unique advantage in making herbicidal formulations because the emulsifying agent used in the compositions is itself an active herbicide. Moreover, these new herbicidal esterified alkanolamine salts do not exhibit any "drifting" tendencies. Hence, these new materials help to overcome two major problems connected with the use of the herbicidal aryloxyalkane carboxylic acids, namely, drift and solubilization.

EXAMPLES

A more complete understanding of the new herbicidal products, compositions and their method of preparation may be had by reference to the following examples in which all parts and percentages are by weight unless otherwise specified.

Example 1

150 parts of triethanolamine and 450 parts of tall oil fatty acids are heated to 250° C. in the course of 2 hours and kept at the maximum temperature for thirty minutes. The reaction is carried out under a blanket of inert gas with strong agitation. Approximately 27 parts of water distills off, which is condensed and measured. The resulting product is tall oil fatty acid esterified triethanolamine in which an average of one and one half of the three available hydroxy groups in the amine are esterified with the tall oil fatty acids. The material is a brown clear liquid.

The resulting 573 parts of mixed triethanolamine esters of tall oil fatty acids are cooled to 100° C. and charged into a mixing vessel provided with a propeller type stirrer and steam jacket. To the above are added 546 parts of trichlorophenoxyacetic acid and the temperature kept at 100° C. to facilitate agitation and solution. In the course of one half hour there is formed an extremely viscous product, brilliantly clear, containing the trichlorophenoxyacetic acid salt of the esterified triethanolamine together with excess trichlorophenoxyacetic acid dissolved therein. 1150 parts of diesel fuel are then added streamwise to the mixing vessel over a period of about ten minutes with agitation. This forms a solution of the tall oil fatty acid esterified triethanolamine salt of trichlorophenoxyacetic acid and excess 2,4,5-D dissolved in diesel fuel in the concentration of about 4 pounds of the solute per gallon of solution.

Example 2

Into a heat-jacketed, condenser-equipped reaction vessel, similar to that used in Example 1, there are charged 150 parts of triethanolamine, 850 parts of tall oil fatty acids and 100 parts of kerosene. The mixture is heated to cause kerosene, along with water formed as a result of the esterification reaction, to be continuously distilled and condensed. Water is withdrawn into the condenser trap while the kerosene is recycled to the reaction vessel, until approximately 50 parts of water have been removed. The hot reaction mixture which consists essentially of the triethanolamine triester of tall oil fatty acids is stripped free of kerosene by the application of vacuum. The product is then transferred to a mixing tank equipped with an agitator and an external jacket and cooled to 100° C. Then, 254 parts of trichlorophenoxyacetic acid are added and the temperature kept at 100° C. for one half hour. After the frothing has ceased and the entrained air allowed to escape, there remains a clear dark viscous product which is the trichlorophenoxyacetic acid salt of the tall oil fatty acid triester of triethanolamine. This product is infinitely soluble in diesel fuel at room temperature.

An additional 217 parts of trichlorophenoxyacetic acid is added and stirred for a half hour at 100° C. temperature. The product is more viscous than before and contains, in addition to the trichlorophenoxyacetic acid salt of the tri tall oil fatty acid ester of triethanolamine, 217 parts of trichlorophenoxyacetic acid in solution. The product, itself, is brilliantly clear, but not infinitely soluble at room temperature in diesel fuel. A 10 gram sample is soluble in at least 500 grams of diesel fuel. 541 parts of diesel fuel are now added streamwise to the continuously stirred mass to form a light brown clear solution comprising about 6 pounds of active herbicidal material per gallon of solution.

The resulting concentrated solution is pumped into steel drums which are then transported to an airfield adjacent a large area planted with young pine trees to be ultimately used for pulp wood, but which has become infested with small oak trees. At the airfield, the kerosene solution is mixed with water in a ratio of 1 gallon of the solution to 10 gallons of water. This produces a viscous W/O emulsion that is spread over the pulp wood area by helicopter. Inspection of the area about one month after the herbicidal treatment reveals that substantially all of the oak trees in the area have been killed, but that the pine trees remain in healthy condition.

Example 3

An ester is formed of 1 mol of trichlorophenoxyacetic acid, 1 mol of tall oil fatty acids and 1 mol of triethanolamine, two mols of water being removed during the esterification reaction. Ten parts of this ester are found to be miscible with 31 parts of kerosene. To the same ester, an additional mol of trichlorophenoxyacetic acid is added and the mixture is heated with agitation to 100° C. to form the amine salt of the ester. Ten parts of this ester amine salt are found to be miscible with 30 parts of kerosene and the solution can be mixed with water to give a stable W/O emulsion.

To a mol of the original ester is added two mols of trichlorophenoxyacetic acid and the mixture is heated to 100° C. One mol of the acid reacts with the ester to form the amine salt and the second mol dissolves in the amine salt to give a clear, viscous product. Ten parts of this product are found to be miscible with 8 parts of kerosene. On the addition of water, a good W/O emulsion is obtained with moderate stirring.

DETAILED DESCRIPTION

A preferred alkanol amine for use in preparing the new herbicidal amine salts of this invention is triethanolamine. Other usable alkanol amines include diethanol methyl amine, ethanol diethylamine, diethanol butyl amine, ethanol hexyl ethyl amine, diethanolamine, diethanol hexyl amine, propanol di-isopropylamine, di-n-propanolamine, tri-n-propanolamine, di-or tri-isopropanolamine, tri-n-butanolamine, tri-n-hexanolamine, hexanol diethyl amine, hexanol dihexyl amine, and trishydroxymethyl aminomethane.

Alkanolamines containing a plurality of amino groups may also be used, e.g., polyalkanol substituted amines such as ethylenediamine, diethylenetriamine, triethylenetetraamine, tetramethylene diamine or the like. Specific examples include N,N,N',N'-tetrabis (2-hydroxypropyl) ethylenediamine; N,N'-bishydroxyethyl ethylenediamine; $N_1,N_3$-bishydroxyethyl diethylenetriamine; N,N,N',N'-tetrabis (2-hydroxypropyl) tetramethylenediamine; N,N'-bishydroxyethyl-N,N'-dimethyl ethylenediamine; $N_1,N_3$-bishydroxymethyl diethylenetriamine and 3-bis (2-hydroxyethylamine) propylamine.

Alkanolamines containing, in addition to amino groups, ether groups may also be used. Such compounds may be derived from amines as mentioned above by reaction with alkylene oxides, particularly ethylene oxide or propylene oxide, or by dehydration of alkanolamines. Specific examples include 1,8-bis(dimethylolamino)diethyl glycol ether; 1,6 - bis(methylolamino)dimethyl glycol ether; N,N,N',N' - tetrabis - (2 - hydroxypropyl)pentaethylenoxyethylene diamine and $N_1,N_3$-dihydroxyethyl-bis-(aminoethyleneoxyethylene)amine.

Mixtures of two or more of the alkanol amines as indicated above may be used.

The preferred monocarboxylic acids for use in formation of the esterified alkanolamines employed in this invention are the so-called fatty acids, i.e., acyclic monocarboxylic acids containing between about 10 and 20 carbon atoms, but other $C_7$ to $C_{20}$ aliphatic acids, cycloaliphatic and naphthenic acids may be employed. Oleic acid and stearic acid are particularly useful for this purpose, but other usable acids include caprylic, capric, lauric, α-ethyl lauric, myristic, palmitic, arachidic, linoleic and linolinic acids, coconut oil acids, tall oil fatty acids, abietic and other rosin acids, cyclonaphthenic acids, and mixtures thereof.

In order to form the esterified alkanolamines used to make the novel herbicidal salts of the invention, at least one mol of the esterifying acid is used for each mol of alkanolamine. As indicated, trialkanolamines are preferred and with them, it is preferable to use about 2 mols of the esterifying acid for each mol of the trialkanolamine.

The esterification of the alkanolamine can be accomplished under various conditions which will produce an esterification reaction between the acid and the amine. Elevated temperatures should be employed, e.g., temperatures between about 70° C. and 250° C. in conjunction with some method of removing the water produced by the esterification reaction. This can best be accomplished by including in the reaction mixture some water immiscible inert solvent boiling within the range of about 70° to 250° C., which will steam distill off the reaction water. For example, the alkanolamine and fatty acids together with benzene as a water carrier may be charged into a reaction vessel equipped with external heating coils and a top closure to which there is connected a condenser and recycle trap. The reactants in the vessel are then heated to a boiling temperature. Benzene and the water formed in the esterification reaction distill off from the reaction mixture and are condensed. This condensate runs back into the recycle trap in which the water settles to the bottom while the benzene overflows and returns to the reaction vessel. After sufficient water has been collected in the trap, recycle of the benzene back into the reaction vessel is discontinued and a vacuum is applied to cause the benzene to be removed by distillation. The haloaryloxyacetic acid is added to this ester in the same manner as it is added to the ester made without the use of a water carrier.

In carrying out the esterification of the alkanol amines, reaction conditions which tend to form amides should be avoided. As is well known, some alkanol amines have a greater tendency toward amide formation during esterification than others. If desired, extraction methods may be applied to separate the ester from the amide formed as a by-product in the esterification process.

Following the completion of the esterification, which may be determined by the amount of water removed from the reaction mixture, the inert solvent may be distilled off, vacuum distilling for this purpose being recommended. On the other hand, it is not necessary to remove the solvent, and this may be carried over to form a part of the new herbicidal concentrates of the invention. Esterification catalysts may be incorporated in small amounts in the reaction mixtures.

The preferred aryloxylalkane monocarboxylic acids for use in making the new herbicidal amine salts are 2,4-dichlorophenoxy acetic acid and 2,4,5-trichlorophenoxyacetic acid. Other usable herbicidal acids include phenoxyacetic acid; α-naphthoxy acetic acid; β-naphthoxy acetic acid; phenoxypropionic acid; 4-chlorophenoxy acetic acid; 4-chlorophenoxy propionic acid; di-(4-chlorophenoxy) acetic acid; 4-bromo phenoxy acetic acid; 4-fluorophenoxy acetic acid; 2-chloro, 4-bromophenoxy acetic acid; 2-methyl, 4-chlorophenoxyacetic acid; 2,5-diethyl, 4-chlorophenoxyacetic acid; 5,7-dichloro-α-naphthoxyacetic acid and other haloaryloxyl monocarboxylic acids such as mentioned in U.S. 2,446,836. Mixtures containing 25 to 75% by weight of 2,4-dichlorophenoxy acetic acid and the remainder of 2,4,5-trichlorophenoxy acetic acid are particularly effective as weed killers, but other suitable mixtures of the acids may be employed.

In forming the amine salt, 1 mol of the herbicidal acid will react with 1 mol of the esterified alkanolamine, at which time further salt formation will cease. Various temperatures, e.g., 20° to 150° C. may be used in carrying out the salt formation step. However, since the resulting products are very viscous, it has been found advisable to use a temperature about 100° C. so that the mixture may be properly stirred.

It has been discovered that these amine salts have the property of dissolving additional quantities of the free herbicidal acids. For example, up to 2 additional mols of free acid per mol of salt may be included in the reaction product and still obtain clear, so-called "brilliant," solutions. Such products are tan to light brown in color and are relatively viscous, having a consistency somewhat like corn syrup. This unique property of the new salts to dissolve or solubilize further quantities of the herbicidal acid is an important feature of the invention. Thus, it helps to increase the proportion of herbicidally active component in the final product. As can be appreciated, the more herbicidal acid in the product and the less proportion of esterified triethanolamine, the more potent will be the herbicidal composition per unit cost of ingredients.

The new herbicidal salts, with added herbicidal acid dissolved in the salts, are soluble in a wide variety of readily available, inexpensive solvents. For example, these herbicidal products can be dissolved in diesel fuel, kerosene, methyl naphthalene, fuel oil, turpentine, xylene, Stoddard solvent, V.M. & P. naphtha, chlorinated kerosene and the like. Such solutions can be used directly as herbicides for application to vegetated areas to control plant growth. Accordingly, the proportion of active herbicidal product relative to the solvent may be varied and will depend to some extent upon the particular manner in which the herbicidal composition is to be employed. Where a concentrate consisting of a solution of the herbicidal product in a solvent is desired for mixing with water or additional solvent in the field at the point of use, solutions containing between about 1 and 5 lbs. of herbicidal product dissolved in each gallon of solution are recommended.

The preferred herbicidal concentrates of this invention are infinitely soluble in kerosene and solutions in kerosene can be used without resort to emulsification. Alternatively, the amine salts may be emulsified, without any added kerosene, to give good W/O emulsions. The amine salts may also be formed into O/W emulsions using suitable emulsifying agents, with or without added inert solvents.

The herbicidal salts of this invention may be mixed with other herbicidal products if desired for the preparation of special formulations. For example, solutions of these salts in suitable solvents may contain herbicidal esters such as the alkanol esters, glycol esters, or other esters of 2,4-D and 2,4,5-T. Such special formulations may also include, if desired, surface active agents, spreading agents, photochemical catalysts (see U.S. 2,446,836) or the like.

New herbicidal compositions may be applied to vegetated areas in any suitable fashion known to the art. This includes application by misting, spraying, dusting or the like. However, as previously indicated, the new herbicidal concentrates are especially effective for the production of water-in-oil emulsions which may be applied with rotating-plate dispersing equipment designed to distribute the herbicidal emulsion as large drops which cannot be easily spread by air currents to adjacent areas on which it is not desired to have the herbicidal composition fall. Emulsions containing 5 to 15 gallons of water per gallon of herbicidal concentrate, as previously described, have been found satisfactory.

CONCLUSION

In the foregoing specification, there is described a development concerning new herbicidal compositions which contain aryloxy alkane carboxylic acids as the effective herbicidal ingredient. These improvements in herbicidal compositions are founded upon the discovery that amine salts formed from esterified alkanolamines and the herbicidal acids, not only are soluble in low cost hydrocarbon solvents even in concentrated amounts, but also that these amine salts have the ability to dissolve or solubilize very substantial quantities of the herbicidal acids. This makes possible the formation of herbicidal compositions containing herbicidal agents which are of such low volatility that they may be applied to vegetated areas without creating problems of "drifting" to adjacent areas. Consequently, the invention provides a practical solution to the problem of continued use of herbicides derived from aryloxy alkane carboxylic acids in those political subdivisions or states where legislation has been passed prohibiting the use of esters of these herbicidal acids or other herbicides which are not free of drifting problems.

Having provided a complete description of the invention in such manner as to distinguish it from other inventions and from what is old, and having provided a description of the best mode contemplated of carrying out the invention, the scope of patent protection to be granted the invention is defined by the following claims.

I claim:

1. A herbicidal composition containing as an active ingredient an alkanolamine salt of a herbicidal aryloxyalkane monocarboxylic acid esterified with a $C_7$ to $C_{20}$ aliphatic monocarboxylic acid.

2. A herbicidal composition containing as an active ingredient a salt of a herbicidal aryloxyalkane monocarboxylic acid and an alkanolamine esterified with an aliphatic monocarboxylic acid containing 7 to 20 carbon atoms.

3. An amine salt of a herbicidal aryloxyalkane monocarboxylic acid and an alkanolamine esterified with a 7 to 20 carbon atom monocarboxylic acid selected from the group consisting of aliphatic acids and cycloaliphatic acids.

4. An esterified alkanolamine salt of a herbicidal aryloxyalkane monocarboxylic acid of the formula:

$$\text{Ar}-\text{O}-\text{R}_1-\text{COO}-\overset{\overset{\displaystyle R_4}{|}}{\underset{\underset{\displaystyle R_5}{H}}{N}}-\text{R}_2\text{OOCR}_3$$

wherein Ar is an aryl radical, $R_1$ and $R_2$ are alkylene radicals, $R_3$ is an alkyl radical of 6 to 19 carbon atoms, and $R_4$ and $R_5$ are radicals selected from the group consisting of hydrogen, alkyl, alkanol and —$R_2$OOCR$_3$.

5. A herbicidal composition which comprises a water-in-oil emulsion having a disperse phase consisting essentially of water particles and a continuous phase comprising a solution of a fatty acid esterified alkanolamine salt of a haloaryloxy alkane monocarboxylic acid dissolved in a liquid hydrocarbon.

6. A herbicidal composition which comprises a water-in-oil emulsion having a disperse phase consisting essentially of water particles and a continuous phase comprising a fatty acid esterified ethanolamine salt of a chlorophenoxy acetic acid.

7. A herbicidal composition containing as an active ingredient a fatty acid esterified ethanolamine salt of a chlorophenoxy acetic acid.

8. A composition which may be mixed with water to form a viscous water-in-oil emulsion that may be used as a herbicide to control the growth of vegetation in a selected area which comprises a solution of a fatty acid esterified alkanolamine salt of a halophenoxy alkane monocarboxylic acid dissolved in a liquid hydrocarbon solvent.

9. A composition which may be mixed with water to form a viscous water-in-oil emulsion that may be used as a herbicide to control the growth of vegetation in a selected area which consists essentially of a solution of a fatty acid esterified ethanolamine salt of a chlorophenoxy acetic acid dissolved in a liquid hydrocarbon solvent.

References Cited in the file of this patent

UNITED STATES PATENTS

| | | |
|---|---|---|
| 2,390,941 | Jones | Dec. 11, 1945 |
| 2,590,815 | Dosser et al. | Mar. 25, 1952 |
| 2,771,477 | De Atley et al. | Nov. 20, 1956 |